United States Patent
Teves

(10) Patent No.: US 6,296,801 B1
(45) Date of Patent: Oct. 2, 2001

(54) PROCESS OF MAKING AN ENDOTRACHEAL TUBE

(76) Inventor: Leonides Y. Teves, 1607 54th St. West, Bradenton, FL (US) 34209

(*) Notice: Subject to any disclaimer, the term of this patent is extended or adjusted under 35 U.S.C. 154(b) by 0 days.

(21) Appl. No.: 09/406,289

(22) Filed: Sep. 24, 1999

(51) Int. Cl.[7] .................................................. B29C 53/08
(52) U.S. Cl. ......................... 264/295; 264/296; 264/320; 264/339
(58) Field of Search ................................. 264/295, 296, 264/320, 322, 339

(56) References Cited

U.S. PATENT DOCUMENTS 6,024,764 * 2/2000 Schroeppel ........................ 264/296 X

* cited by examiner

Primary Examiner—Leo B. Tentoni
(74) Attorney, Agent, or Firm—Ronald E. Smith; Smith & Hopen, P.A.

(57) ABSTRACT

An endotracheal tube having utility in one lung ventilation has a curvature of predetermined radius formed in its distal end so that it is easily introducible into a left bronchus or a right bronchus of a trachea. The curvature is produced by first inserting a straight copper tube into the distal free end of a conventional straight endotracheal tube. The copper tube is then bent into the desired radius of curvature and the distal end of the endotracheal tube is inserted into an oven at a temperature of about one hundred seventy degrees to soften the thermoplastic materials of which the endotracheal tube is made. After the thermoplastic materials have softened and conformed to the curvature of the copper tube, the distal end is allowed to cool and the copper tube is then removed therefrom. When cooled, the distal end of the endotracheal tube maintains its curvature when the copper tube is withdrawn due to the thermoplastic quality of the materials from which the endotracheal tube is made.

4 Claims, 2 Drawing Sheets

PROCESS OF MAKING AN ENDOTRACHEAL TUBE

BACKGROUND OF THE INVENTION

1. Field of the Invention

This invention relates, generally, to endotracheal tubes. More particularly, it relates to an endotracheal tube having utility in surgical procedures requiring that one lung remain ventilated.

2. Description of the Prior Art

The human trachea has an elongate straight section that bifurcates into two branches, known as the left bronchus and the right bronchus, that respectively lead to the left and right lungs.

In surgical procedures involving parts of the body other than the lungs, an endotracheal tube is introduced into the trachea such that the leading end of the tube is positioned at a location, known as the carina, which is upstream of the left and right bronchus. A balloon-like member near the leading end of the endotracheal tube is then inflated to prevent air from the atmosphere from entering into the patient's lungs. Anesthesia and oxygen are then introduced into the patient's lungs through the endotracheal tube. In this way, the patient's breathing and the administration rate of anesthesia is under the control of an anesthesiologist. When the procedure is over and the patient is ready to be brought off of anesthesia, the balloon-like member is deflated and the endotracheal tube is withdrawn.

However, if a lung is to be operated upon, it must be shut down. The other lung must therefore be ventilated to keep the patient breathing. The ventilation of one lung while the other lung is shut down is known as one lung ventilation.

One lung ventilation is difficult to achieve with a conventional endotracheal tube because such tubes are straight in configuration. They are designed to go straight down the trachea to the carina and are not intended to be inserted into the left or right bronchus. However, the angle between the trachea and the right bronchus is not very sharp, and a skilled surgeon can usually introduce the leading end of an endotracheal tube into the right bronchus. This blocks off atmospheric air to the left bronchus, thereby shutting down the left lung. The balloon-like member is then inflated and anesthesia and oxygen are introduced into the right lung to keep it working while the surgeon operates on the left lung.

The angle between the trachea and the left bronchus is much sharper, however, and a conventional endotracheal tube cannot be introduced into the left bronchus with the same relative ease as the right bronchus. Accordingly, a conventional endotracheal tube cannot be used when a patient's left lung is to be ventilated while the right lung is shut down.

In response to this limitation, earlier inventors developed special endotracheal tubes that are capable of being inserted into the left or right bronchus. The one that has achieved commercial success is extraordinarily expensive; a common endotracheal tube costs less than ten dollars but the one in common use for one lung ventilation procedures costs about two hundred fifty dollars. It is a tube-in-tube structure where the inner, smaller tube is pushed to the side of the operated-upon lung to enable its introduction into the left or right bronchus. In use, the inner tube protrudes beyond the distal end of the outer or main tube; the main tube delivers oxygen and gas. A solid ball-like member is mounted at the distal end of the inner tube to close off the bronchus to be shut down. The outer tube has a diameter sufficient to accomplish adequate ventilation of the unoperated side.

One major drawback of this well-known tube, other than its expense, is the fact that the tube-in-tube arrangement restricts the flow of anesthesia into the ventilated lung and produces turbulence, requiring the anesthesiologist to make adjustments in the gas flows.

What is needed is an inexpensive endotracheal tube that facilitates its introduction into a left or right bronchus and which performs just like a conventional endotracheal tube so that an anesthesiologist may use it in the same manner as a conventional endotracheal tube, in the absence of a need to adjust flow rates to accommodate restrictions.

However, it was not obvious to those of ordinary skill in this art how the needed improvements could be provided, in view of the art considered as a whole at the time the present invention was made.

SUMMARY OF THE INVENTION

The long-standing but heretofore unfulfilled need for an innovation that overcomes the limitations of the prior art is now met by a new, useful, and nonobvious invention. The present invention includes an endotracheal tube having an elongate straight section and a distal end having a predetermined curvature; the predetermined curvature facilitates selective introduction of the distal end into a left bronchus and a right bronchus.

The novel method for making the endotracheal tube of this invention includes the steps of slideably inserting a straight member of predetermined construction into a distal end of a straight endotracheal tube, and bending the straight member to give it a predetermined radius of curvature. The straight member then becomes a curved member.

The distal end of the endotracheal tube is then heated to a predetermined temperature sufficient to cause softening of the distal end. The distal end is maintained at the predetermined temperature for a time sufficient to cause the distal end to conform to the predetermined radius of curvature of the curved member The inner diameter of the distal end is maintained, i.e., it is not affected by the bending.

The distal end is then allowed to cool and the curved member is removed therefrom.

The step of heating the distal end is performed by inserting the distal end into an oven means; the predetermined temperature is about one hundred seventy degrees.

The straight member is preferably a copper tube because such tubes are easily bent and retain their structural integrity at temperatures above one hundred seventy degrees. The copper tube does not become kinked when bent, thereby ensuring that the inner diameter of the distal end of the endotracheal tube will not be affected by the bending.

The novel method produces an endotracheal tube having a distal end with a predetermined curvature formed therein, but similar methods are within the scope of this invention.

It is a primary object of this invention to provide an improved endotracheal tube suitable for use in one lung ventilation procedures.

Another object is to provide such an endotracheal tube that performs like a conventional tube so that anesthesiologists may use it just as they would a conventional endotracheal tube.

Still another object is to accomplish these objects with a tool that is inexpensive.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
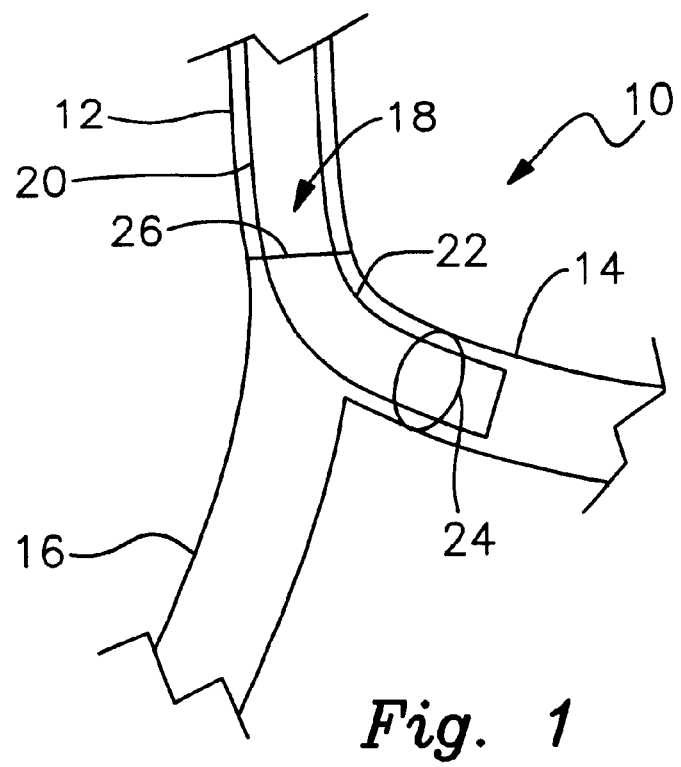
FIG. 1 is a diagrammatic view of a trachea, a left bronchus, a right bronchus and the novel endoscope when positioned in the left bronchus.

Referring now to FIG. 1, it will there be seen the environment of the present invention is denoted as a whole by the reference numeral 10.

Trachea 12 is generally straight in configuration and branches off into left bronchus 14 and right bronchus 16.

Novel endotracheal tube 18 has a conventional straight section 20 and a highly novel curved section 22 at its distal free end. Balloon-like member 24, which forms no part of this invention, per se, is depicted in its inflated position. When tube 18 is so deployed, the left bronchus is ventilated and the right bronchus is not so it may be operated upon. Note how tube 18 blocks off air to the right bronchus in the region of carina 26.

Significantly, the formation of curvature 22 in the distal end of endotracheal tube 18 makes its insertion into the left bronchus as easy as the insertion of a straight tube into the trachea.

Figure 2:
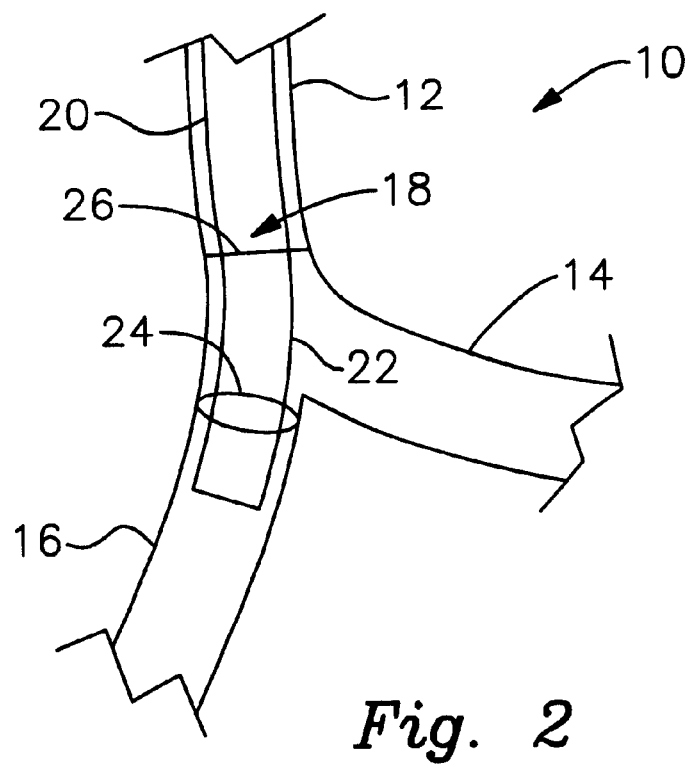
FIG. 2 is a diagrammatic view like that of FIG. 1, but depicting the novel endoctracheal tube when positioned in the right bronchus.

As indicated in FIG. 2, insertion of curved section 22 into the right bronchus is just as easy.

Figure 3A:
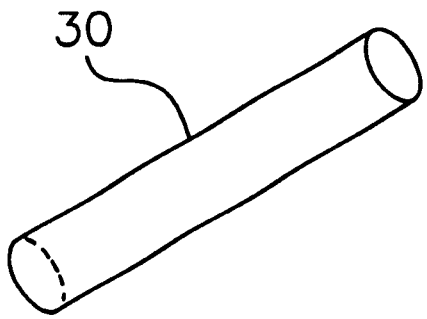
FIG. 3A is a perspective view of a straight copper tube.

There are a number of ways of manufacturing novel tube 18, and all of such manufacturing methods are within the scope of this invention. The preferred way to begin the formation of novel endotracheal tube 18 is to insert a straight copper tube 30 FIG. 3A) into the distal end of a conventional straight endotrachel tube, and to bend the copper tube into the desired curvature after it has been inserted into said distal end. Alternatively, the copper tube could be bent first and then introduced into said distal end.

Figure 3B:
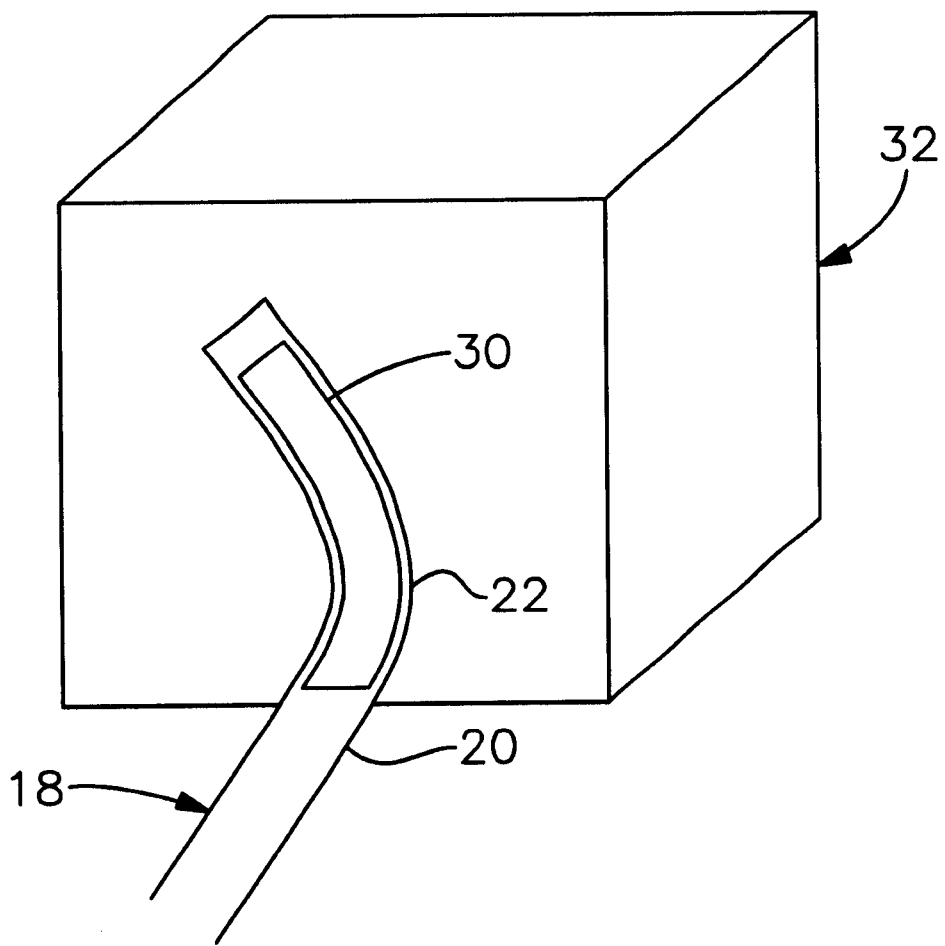
FIG. 3B is a perspective view depicting a step of the novel manufacturing process used to produce the novel endotracheal tube.

The assembly is then introduced into an oven 32 (FIG. 3B) having a temperature of about one hundred seventy degrees, which temperature does not cause melting of copper tube 30 or endotracheal tube 18 but which is sufficient to soften the thermoplastic materials out of which a conventional endotracheal tube is made. Once softened, the distal end of the endotracheal tube will conform to the curvature of the copper tube and there will be no kinks in said distal end. The assembly is then removed from the heat source and allowed to cool. After the endotracheal tube has cooled, the copper tube is removed therefrom. Since the materials of which the endotracheal tube is formed are thermoplastic, the distal end of the endotracheal tube will have a permanent curvature in its distal end when it cools, said curvature matching that of the copper tube.

The steps of inserting the copper tube, bending it, heating the assembly to a relatively low temperature, allowing the assembly to cool and removal of the bent copper tube adds little cost to the final product, enabling production of a one lung ventilation endotracheal tube that costs substantially less than the one lung ventilation endotracheal tube heretofore known.

When a surgical procedure, such as lobe resection (lobectomy), is finished, the endotracheal tube may be pulled back just above the carina so that both the left and right lungs may be ventilated. Here the normal inside diameter is maintained throughout, avoiding turbulence of flow of gases, including oxygen. If one side of the lung is resected (pneumonectomy), there is no need to pull back the endotrachel tube.

This invention represents a major breakthrough in the art of endotracheal tubes. Being drawn to a pioneering invention, the claims that follow are entitled, as a matter of law, to broad interpretation to protect the heart or essence of the invention from piracy.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method for making an endotracheal tube having a predetermined curvature formed in a distal end thereof, comprising the steps of:

slideably inserting a straight member of predetermined construction into a distal end of a straight endotracheal tube;

bending said straight member to give it a predetermined radius of curvature, said straight member then being a curved member;

heating said distal end of said endotrachael tube to a predetermined temperature sufficient to cause softening of said distal end;

maintaining said distal end at said predetermined temperature for a time sufficient to cause said distal end to conform to the predetermined radius of curvature of said curved member;

cooling said distal end and removing said curved member;

whereby an endotracheal tube having a distal end with a predetermined curvature formed therein is produced.

2. The method of claim 1, wherein the step of heating said distal end is performed by inserting said distal end into an oven means.

3. The method of claim 1, wherein said predetermined temperature is about one hundred seventy degrees.

4. The method of claim 1, wherein said straight member is a copper tube.

* * * * *